United States Patent
Becker

(10) Patent No.: US 11,794,932 B2
(45) Date of Patent: Oct. 24, 2023

(54) FORMING SHOULDER AND METHOD FOR PRODUCING A FORMING SHOULDER

(71) Applicant: ROVEMA GMBH, Fernwald (DE)

(72) Inventor: Thomas Becker, Bad Nauheim (DE)

(73) Assignee: Rovema GmbH, Fernwald (DE)

( * ) Notice: Subject to any disclaimer, the term of this patent is extended or adjusted under 35 U.S.C. 154(b) by 543 days.

(21) Appl. No.: 16/640,648

(22) PCT Filed: Jul. 19, 2018

(86) PCT No.: PCT/EP2018/069674
§ 371 (c)(1),
(2) Date: Feb. 20, 2020

(87) PCT Pub. No.: WO2019/037969
PCT Pub. Date: Feb. 28, 2019

(65) Prior Publication Data
US 2020/0354093 A1    Nov. 12, 2020

(30) Foreign Application Priority Data
Aug. 22, 2017  (DE) ...................... 10 2017 214 651.6

(51) Int. Cl.
| B29C 53/52 | (2006.01) |
| B65B 9/22 | (2006.01) |
| B33Y 10/00 | (2015.01) |
| B33Y 80/00 | (2015.01) |
| B29L 23/00 | (2006.01) |
| B29L 31/00 | (2006.01) |

(52) U.S. Cl.
CPC ................ *B65B 9/22* (2013.01); *B29C 53/52* (2013.01); *B33Y 10/00* (2014.12); *B33Y 80/00* (2014.12); *B29L 2023/001* (2013.01); *B29L 2031/7128* (2013.01)

(58) Field of Classification Search
CPC ...... B65B 9/22; B29C 53/52; B29L 2023/001
See application file for complete search history.

(56) References Cited

U.S. PATENT DOCUMENTS

2003/0050166 A1    3/2003  Dominguez, Jr. et al.

FOREIGN PATENT DOCUMENTS

| DE | 4038888 A1 | 6/1992 | |
| DE | 4320713 A1 * | 1/1995 | ............. B29C 53/52 |

(Continued)

OTHER PUBLICATIONS

PCT English Language Translation of the International Preliminary Report on Patentability, PCT/EP2018/069674, dated Mar. 5, 2020, 6 pages.

(Continued)

*Primary Examiner* — James Sanders
(74) *Attorney, Agent, or Firm* — Quarles & Brady LLP

(57) ABSTRACT

A forming shoulder for forming a film tube from a flat film web and a method for producing a forming shoulder. The forming shoulder comprises a shoulder piece and a prism piece which are connected to each other along a forming edge, the shoulder piece having an outer shoulder surface via which the film web can be guided to an entry opening of the prism piece limited by the forming edge, the forming edge being made of at least one metal piece, a plastic shoulder piece and/or a plastic prism piece being molded onto the metal piece.

4 Claims, 2 Drawing Sheets

(56)  References Cited

FOREIGN PATENT DOCUMENTS

| | | |
|---|---|---|
| DE | 4320713 A1 | 1/1995 |
| DE | 20320160 U1 | 7/2004 |
| DE | 10309020 A1 | 9/2004 |
| WO | 2012028632 A1 | 3/2012 |
| WO | 2014170121 A1 | 10/2014 |

OTHER PUBLICATIONS

PCT International Search Report, PCT/EP2018/069674, dated Oct. 12, 2018, 12 pages.

* cited by examiner

FORMING SHOULDER AND METHOD FOR PRODUCING A FORMING SHOULDER

CROSS-REFERENCE TO RELATED APPLICATIONS

This application represents the national stage entry of PCT International Patent Application No. PCT/EP2018/069674 filed Jul. 19, 2018, which claims priority to German Patent Application No. DE 10 2017 214 651.6 filed Aug. 22, 2017. The contents of these applications are hereby incorporated by reference as if set forth in their entirety herein.

The disclosure relates to a forming shoulder according to the preamble of claim 1. Furthermore, the disclosure relates to a method for producing a forming shoulder.

Different methods are known for producing forming shoulders, as used for tubular bag machines, for example. Such forming shoulders commonly comprise a shoulder piece and a prism piece which are connected to each other along a forming edge. One possibility for producing such forming shoulder consists of producing each individual forming shoulder manually by first manufacturing the required individual pieces and subsequently assembling them. After assembling the individual pieces, the size accuracy of the forming shoulder and its behavior during use is tested and in general several steps of precision machining are carried out in order to eliminate deviances from the intended size for achieving a wrinkle-free formation of the flat film web to the intended film tube.

Commonly, a production method is used in which the theoretically determined individual pieces are machine-produced, for example by milling or bending, and are subsequently assembled manually. In a forming shoulder cut from sheet metal, for example, the flat sheet blanks of the individual pieces of the shoulder piece and the prism piece and of a flange and a supporting element, if required, are first precisely cut via laser cutting and/or milling. The prism piece and the shoulder piece are subsequently bent mostly manually and positioned in relation to each other manually and fixated by welding or soldering. The precise bend of the prism piece can be precisely produced and measured by means of bending machines.

Prism pieces for round tubular cross sections are also made from tube materials in practice, the forming edge being able to be milled minutely precisely with CNC milling machines. However, this method is very cumbersome. The tubes for the different cylinder diameters first have to be kept available, while only a short piece is required per format. The machining when producing the forming edge and, if required, outputting the tube involves expensive and complex precision engineering.

Different methods are known for producing the bent shape of the shoulder piece from a sheet metal cut. On the one hand, the final shape can be produced by gradually and manually bending the sheet metal cut while continuously controlling the bending result by means of specially produced bending gauges. It is fairly simple and quick to pre-bend the shape of the shoulder sheet metal, meaning to produce it fairly imprecisely. The pieces deviate by ±10 mm, for example, from the predetermined form. A precision of at least ±0.2 mm, however, is required. Hence, this method requires much work experience and time.

On the other hand, the shaping of the shoulder piece can simultaneously take place with the assembly of the shoulder piece on the prepared prism piece. This is faster but more imprecise. If the spatial shape of the shoulder piece does not match the theoretically determined shape, then the quality of the principally exact contour of the forming edge on the prism piece is also reduced. Wrinkles may form when forming the tube, for example.

From DE 10 2010 036 229 A1 a forming shoulder is known which is produced by cutting and forming several sheet metal sections. A great disadvantage is that the highly complex free-form surfaces, in particular of the shoulder piece, can only be produced with great costs.

Starting from this state of the art, it is therefore the object of the disclosure at hand to propose a new forming shoulder and a new method for producing a forming shoulder by means of which the production results can be replicated more easily and with higher production precision.

The object is attained by a forming shoulder and a method according to the teachings of the independent main claims.

Advantageous embodiments of the disclosure are the subject matter of the dependent claims.

The forming shoulder according to the disclosure rests on the basic idea that only the forming edge itself is formed from a metal piece. As only the forming edge of the forming shoulder is exposed to great wear and must exhibit a corresponding wear resistance. A plastic shoulder piece and/or a plastic prism piece is/are molded onto the metal piece forming the forming edge and form the forming shoulder in conjunction with the metal piece. Since plastic can be processed considerably more easily and certainly very precisely with the aid of simpler means, the production effort and replicability can be significantly improved by using the forming shoulder according to the disclosure.

The advantage of the disclosure is particularly great if the shoulder piece as well as the prism piece is made of plastic so essentially only the forming edge is made of a metal piece.

With regard to the exact forming when producing the forming shoulder and for producing a high-strength connection between the metal piece and the plastic pieces of the forming shoulder, it is particularly advantageous if the plastic of the shoulder piece and the plastic of the prism piece are connected to each other and enclose the metal piece for forming the forming edge on the backside facing away from the film. Consequently the metal piece forming the forming edge is at least partially embedded in the plastic of the shoulder piece and/or the prism piece.

It is particularly easy and inexpensive if the plastic shoulder piece and/or the plastic prism piece is/are produced using a plastic printing method.

The method according to the disclosure is characterized in that at least one metal piece is fixated in a plastic printing device for forming a forming edge. Subsequently, the shoulder piece and/or the prism piece is/are produced using 3D plastic printing and is/are connected to the metal piece in the process.

An embodiment of the disclosure is schematically shown in the drawings and is described in the following using examples.

Figure 1:
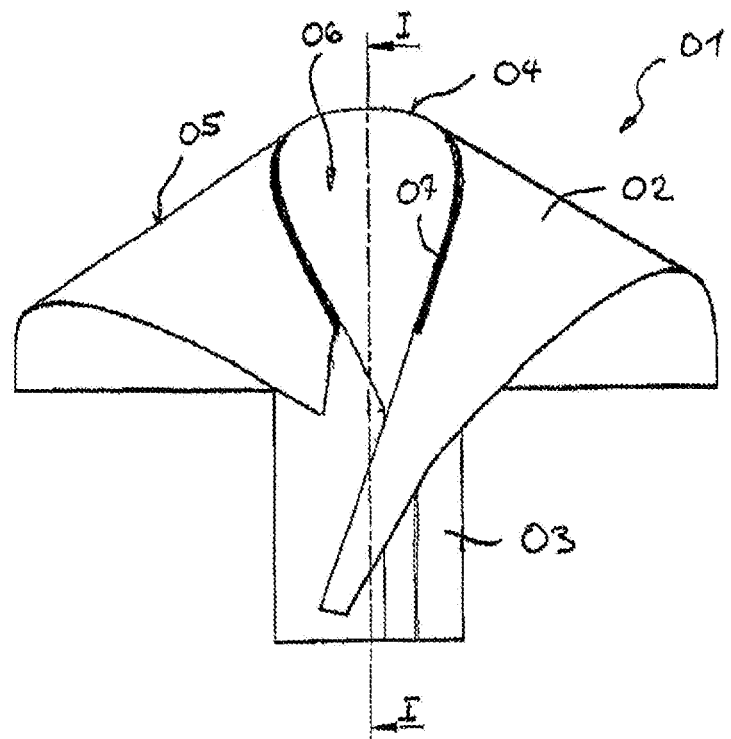
FIG. 1 shows a top view of a forming shoulder.

FIG. 1 shows a forming shoulder 01 in a front view. Forming shoulder 01 serves for use in a tubular bag machine in order to form a film tube from a flat film web, the film tube subsequently being able to be processed into tubular bag packaging via longitudinal sealing and transverse sealing. Forming shoulder 01 essentially consists of a shoulder piece 02 and a prism piece 03 which are connected to each other along a forming edge 04. During processing, the flat film web is first pre-shaped at outer shoulder surface 05 and then drawn into entry opening 06 of prism piece 03 via forming edge 04. Via this process, a film tube is made from the flat film web, the cross section of the film tube corresponding to the inner cross section of prism piece 03.

Figure 2:
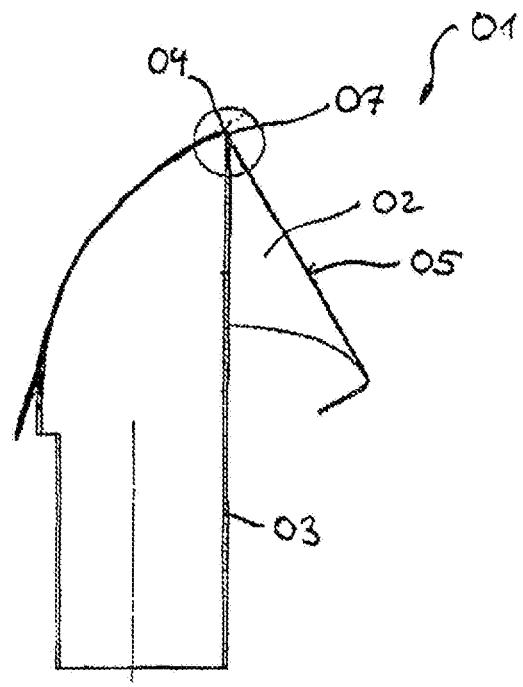
FIG. 2 shows the forming shoulder according to FIG. 1 along cut I-I.

FIG. 2 shows forming shoulder 01 in a cross section along cut I-I.

Figure 3:
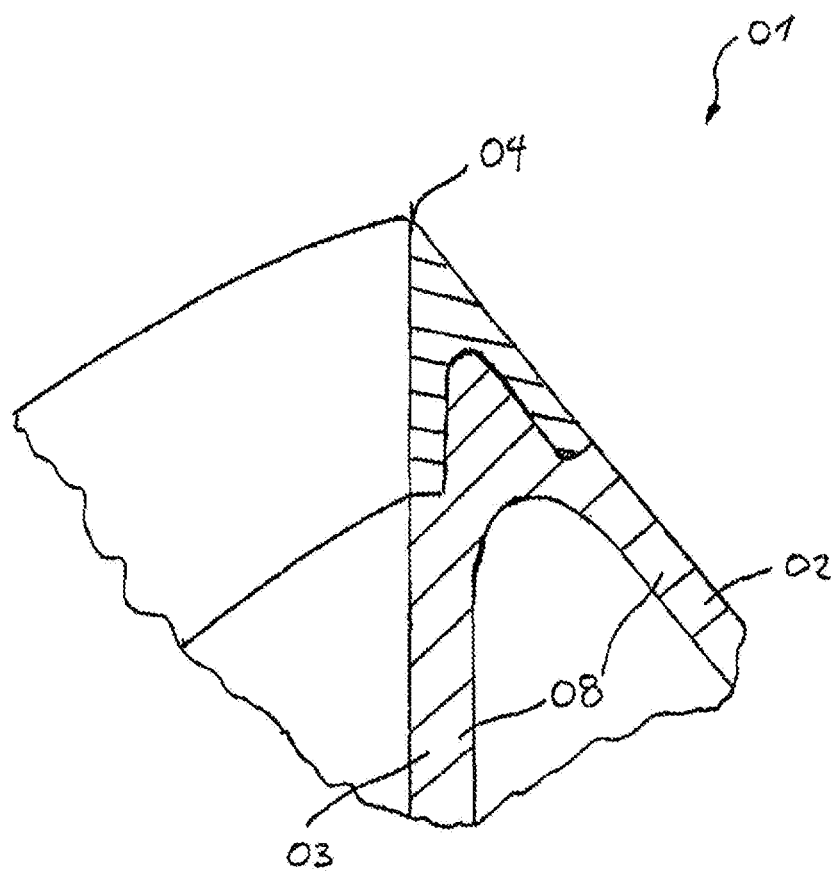
FIG. 3 shows the forming edge of the forming shoulder according to FIG. 2 in an enlarged detailed view.

FIG. 3 shows the cross section of forming shoulder 01 in the area of forming edge 04 in an enlarged detailed view. Forming edge 04 is made from a metal piece 07 which is highly resistant to wear. Metal piece 07 can be produced by machining or original molding, such as, for example, mold casting. Laser sintering is another plausible production possibility.

Disregarding metal piece 07, remaining forming shoulder 01 consists of an inherently stable plastic piece 08 which engages behind metal piece 07 on the backside and overall forms shoulder piece 02 and prism piece 03. For producing forming shoulder 01, metal piece 07 is first clamped in a 3D plastic printing device and there forming shoulder 02 and prism piece 03 are produced using 3D plastic printing with high precision and replicability.

The invention claimed is:

1. A forming shoulder for forming a film tube from a flat film web, the forming shoulder comprising a plastic shoulder piece and a plastic prism piece which are connected to each other along a forming edge, the shoulder piece having an outer shoulder surface via which the film web can be guided to an entry opening of the prism piece limited by the forming edge, and a metal piece extending along the forming edge, wherein the plastic of the shoulder piece and the plastic of the prism piece are connected to each other and enclose the metal piece for forming the forming edge on the backside facing away from the film such that the metal piece forming the forming edge is at least partially embedded in the plastic of the shoulder piece and/or the prism piece.

2. The forming shoulder according to claim 1, wherein the plastic shoulder piece and the plastic prism piece are molded onto the metal piece forming the forming edge, the plastic of the shoulder piece and the plastic of the prism piece being positively bonded to each other and forming a plastic piece.

3. The forming shoulder according to claim 1, wherein the shoulder piece and/or the prism piece is/are produced using a 3D plastic printing method.

4. A method for producing a forming shoulder for forming a film tube from a flat film web, the forming shoulder comprising a shoulder piece and a prism piece which are connected to each other along a forming edge, the shoulder piece having an outer shoulder surface via which the film web can be guided to an entry opening of the prism piece limited by the forming edge, and at least one metal piece extending along the forming edge, the plastic of the shoulder piece and the plastic of the prism piece being connected to each other and enclosing the at least one metal piece for forming the forming edge on the backside facing away from the film such that the at least one metal piece forming the forming edge is at least partially embedded in the plastic of the shoulder piece and/or the prism piece, wherein
 a) the at least one metal piece is fixated in a 3D plastic printing device for forming the forming edge; and
 b) the shoulder piece and/or the prism piece is/are made of plastic using 3D plastic printing and is/are connected to the at least one metal piece in the process.

* * * * *